May 12, 1936.  W. KORESKA ET AL  2,040,142
RECORDING SUPPORT
Original Filed May 2, 1933
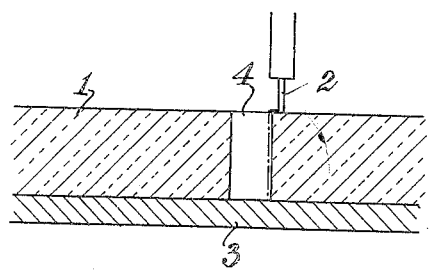
Wilhelm Koreska
Richard Lant
  INVENTORS
By Otto Munk
  their ATTY.

Patented May 12, 1936

2,040,142

UNITED STATES PATENT OFFICE 2,040,142

RECORDING SUPPORT

Wilhelm Koreska and Richard Lant, Vienna, Austria

Original application May 2, 1933, Serial No. 668,919. Divided and this application February 10, 1934, Serial No. 710,640. In Austria May 7, 1932

10 Claims. (Cl. 178—5)

This invention relates to recording supports for recording electric impulses.

The principal object of the present invention is to provide a recording support which is suitable for recording spark discharges.

Another object is to render certain sorts of paper suitable for recording spark discharges.

The known photographic and electro-chemical methods of recording electrical impulses produced in photo-electric cells of picture transmission apparatus, suffer from the disadvantage that an after-treatment or preparation of the receiving paper is necessary. Efforts have therefore been made to discover recording processes in the transmission of pictures, in which the record is immediately visible on the recording support.

The recording support according to the present invention may be used in connection with processes wherein the recording of the impulses is effected by means of spark discharges and the known effect of the electric spark of singeing and thereby discoloring the edges of the hole produced on puncturing the recording support is employed for recording the impulses, the arrangement being such that the receiving paper bridges the spark gap.

This process differs in the intentional utilization of the singeing effect of the electric spark from a known recording process by means of a copying telegraph. According to the latter, the writing received is constituted by a system of holes or dots, whereas the first mentioned process is so carried out that the holes punctured by the sparks are not perceptible when viewed in the usual manner by incident light, and only the discoloration of the edges of the holes becomes visible. This is attained by the fact that the image analysis is carried so far that the discolored edges of the holes punctured by successive sparks adjoin one another directly or almost directly, whereby the records appear as if they had been produced by coloring the paper.

For carrying out this process, the apparatus employed has a transmitter which, as in picture telegraphy, is provided with a photoelectric cell which receives the reflected image of a beam of light scanning the original, and converts the fluctuations in brightness into current impulses. These current impulses are used for controlling a spark gap which is bridged across by a recording support or stencil sheet moved synchronously with the original. The impulses may be impressed at the receiving end upon the grid of a valve belonging to an amplifier of the generator of the spark gap and/or an optic-electric spark generator consisting of means chopping an additional beam of light illuminating the photoelectric cell may be provided. Such an arrangement is free from inertia effects and may be employed either for the wireless transmission of pictures or as a duplicating apparatus. In the latter case in particular, precautions must be taken, however, that the spark has no reaction on the photoelectric cell amplifier in the transmitting apparatus.

Records which appear as a printed impression cannot be made by means of the copying telegraph hereinbefore mentioned. This follows from the mechanical arrangement of the apparatus and from the fact that ordinary well-glazed paper is employed as recording surface, the puncturing voltage of which is very considerably greater than that of air. In order to ensure that the spark shall always puncture the paper at the point at which the needle terminal of the spark gap is situated, or in order to prevent the spark passing through a hole which has previously been punctured, the screen must be many times greater than the thickness of the paper, in which case the discolored edges of the hole do not join together and the lines are reproduced as a series of dots.

A support which is serviceable according to the present invention must have a puncturing voltage which is less than that of the surrounding air, and is preferably less than 300 volts, but the said support must oppose such a considerable resistance to the passage of current that sparks are produced. If such recording supports are employed, the ratio between the speed of rotation of the drum of the receiving apparatus and the frequency of the spark generator controlled by the incoming impulses may be so selected that the holes overlap in the lines. In order to avoid in such a case that the support is cut through along a line it is preferable either to use a screen placed over the original or to interrupt the spark discharge at intervals by an optical-electrical method. If the holes do not overlap in the lines the distance between adjacent holes punctured by the sparks should be less than 0,01 inch (0,25 millimetre). The analysis of the image in the longitudinal direction of the lines is preferably, however, such that five sparks or holes are produced per millimetre. In regard to the analysis of the image in the transverse direction, perfect results can be obtained even with the screen of 0.2 millimetre customary in picture telegraphy.

The needle terminal of the spark gap which is moving over the papers records thin lines like a colored pencil which join together on the receiving drum to form the image of the original. Any drawing or written matter can be used as original.

By means of a recording mechanism constructed to form a spark gap duplicating stencils of originals of any kind can be made.

At the present time, stencils for duplicating purposes are cut on typewriting machines. The typewriting machine types which are applied with a powerful blow to the stencil sheet, force away the coating of the fibrous, wide-mesh Yoshino paper in the vicinity of the outlines of the types, so that the ink of an inking drum can pass through the exposed places and reach a sheet of paper placed under the stencil.

It has been found that the destruction of the coating may be brought about by electric sparks passing through the sheet. Stencils may be made automatically by stretching the original round the transmitting drum and a stencil sheet round the receiving drum of a picture telegraphy apparatus and employing the current impulses which are produced by a beam of light scanning the original, for controlling a recording mechanism on the receiving drum, the said recording mechanism being constituted in the form of a spark gap.

Image analysis is preferably carried as far as in making copies upon paper. By employing a narrow screen, either no bridges are produced in the stencil sheets between adjacent spark punctures or the bridges are only very thin and their presence cannot be detected in the duplicated copies prepared by means of the stencil sheets. A necessary condition for the applicability of a narrow screen is the use of stencil sheets which, just as must be in the case of papers employed for copying, having a puncturing voltage less than that of the surrounding air.

The use of a spark gap for making stencils is also accompanied by the advantage that there is no necessity to employ the fragile Yoshino paper, which is readily damaged, as support for the stencil sheet. If the screen is suitably selected, the recording support is only partly damaged in the vicinity of the characters and bridges are left between the lines punctured by the sparks and possibly also between the holes in one line, which bridges form the connection between the written parts and the unwritten parts. Since the puncturing power of a spark is very high in comparison with the puncturing power of the types of a typewriting machine, the coating may also be made much harder than in the usual sheets. The density of the paper support and the hardness of the coating increase the resistance of the stencil to stresses in the manifolding apparatus very considerably, and therefore the necessary condition for the increase in the number of the copies which may be made with stencils is satisfied.

Commercial papers and stencil sheets have been found to be absolutely unsuitable for recording spark discharges. The puncturing voltage of the papers of 0.05 to 0.15 millimetre in thickness, which come into consideration in regard to the invention, is 800 to 1400 volts and is therefore considerably greater than the rupturing voltage of air of the same thickness of layer, which lies at about 600 volts. Therefore, the paper and stencil sheets are modified by treatments as set forth below to impart a dielectric strength thereto ranging from about 300 volts per 0.05 mm. to about 40 volts per 0.05 mm.

Certain sorts of papers, however, may be rendered serviceable by means of a simple treatment. This treatment consists in the impregnation of the papers with an electrolyte. The efficiency of the electrolyte, however, is related to a given moisture content of the paper. Paper impregnated with non-hygroscopic salts, for example, sodium chloride, give an incorrect record when the air is very dry, but provide good copies under normal atmospheric conditions. In order to ensure serviceability of the paper under all conditions, it is advisable to employ hygroscopic salts, for example magnesium chloride. Not every paper which is impregnated with hygroscopic electrolytes is serviceable, however, for the purposes of the invention, but on the contrary certain conditions must be satisfied also in regard to the sizing of the paper. Sizing with hydrophobe size has been found to be very detrimental and good results can only be obtained with such paper after suitable impregnation with electrolytes, if the size content is below 1%. Hydophile size affects the suitability of the paper only slightly. It is advisable, however, to employ only slightly sized paper, and preferably only unsized paper. The paper should not contain, or should only contain very slight quantities of substances having a high puncturing voltage, for example oil.

Another method of reducing the puncturing voltage consists in embedding good conductors of electricity in the body of the paper. The following materials have been found to be suitable: lamp black, graphite powder, and particularly the finest metal powder, for example aluminium or copper. If desired, the metals may be employed in a colloidally dispersed state.

The measures stated for reducing the puncturing voltage also apply for stencil sheets. In the case of stencil sheets having a support of Yoshino paper, it is sufficient if the good conductors of electricity are mixed only with the coating, because Yoshino paper, on account of its wide mesh and thin fibres, only offers a very slight resistance to the spark puncture.

The recording support must have a puncturing voltage which is less than that of the surrounding air. The factors which are decisive in determining the puncturing voltage will be explained with reference to the diagram of the accompanying drawing, showing on an enlarged scale a sheet of paper 1 with the needle terminal 2 and part of the drum 3. The needle terminal is first situated at the edge of a hole 4 originating from a preceding discharge, and it will be assumed that a discharge occurs in this position. With suitable character of the surface of the paper, it may happen that a spark travels along the path indicated in dotted lines, and not along the shortest path through the paper, although, if the same voltage were applied, a spark would not jump across if the sheet of paper were not present between the poles 2 and 3. In order therefore to be absolutely certain that the spark will puncture the paper exactly at the very point at which the needle terminal of the spark gap is situated, the puncturing voltage of the recording support should be less than that of the surrounding air when the spark track extends along the surface of the support.

*Examples*

(a) *Paper.*—35 to 50 grams of heavy unsized rag paper, such as occurs on the market in the form of carbon tissue paper, are impregnated with an aqueous (about 30 per cent.) solution of magnesium chloride by passing the paper between two rubber rollers, the bottom roller of which dips into the magnesium chloride solution, and the top roller presses off the excess of solution, whereupon the paper is led over drying cylinders. If the impregnated dried paper has a magnesium chloride content of between 3 and 15 per cent. it absorbs spontaneously from the atmosphere a moisture content of between 10 and 20 per cent. The moisture content within these limits may be said to be the most advantageous. If the moisture content is less than 10 per cent. there is a danger that the puncturing voltage of the paper will rise too high, while if it is greater than 20 per cent., the puncturing voltage becomes too low and there is a danger that the constitution of the spark gap will be defective. It is also possible to impregnate ordinary rotary printing paper, but owing to its being composed of cellulose and wood meal such paper suffers from the disadvantage that it is not strong enough when it has the above-mentioned moisture content. It is also possible to employ for the impregnation, instead of magnesium chloride solution, calcium chloride or a mixture of glycerine and sodium chloride or sodium lactate. Glycerine without the addition of electrolyte gives unsatisfactory results.

(b) *Stencil sheets.*—(1) So-called Yoshino tissue paper is impregnated with a solution of 11 parts of highly viscous nitrocellulose, 5 parts of calcium chloride and 5 parts of trykesyl phosphate in 180 parts of a mixture of ether and alcohol in the ratio of 1:1, and in 20 parts of butyl alcohol, so that the dried sheet has a weight of approximately 35 to 40 grams per square metre.

(2) The same sort of Yoshino paper is impregnated with a solution of 13 parts of nitro-cellulose in 230 parts of 1:1 ethyl alcohol and 70 parts of butyl alcohol in which solution a well-triturated mixture of 26 parts of castor oil and 26 parts of the finest aluminium powder is homogeneously dispersed, so that the weight of the dried stencil sheet is 40 to 50 grams per square metre. In addition, 5 parts of calcium chloride may be added in order to reduce the puncturing voltage of the stencil sheet still further.

(3) Yoshino paper is impregnated with an aqueous solution of 20 parts of high-grade gelatine, 30 parts of glycerine and 10 parts of sodium lactate. The weight of the dried stencil sheet should be 30 to 40 grams. The dried stencil sheet is hardened by treatment with formaldehyde vapors, that is to say, it is rendered insoluble in water. Instead of sodium lactate, it is also possible to add, for example, 2 parts of sodium chloride.

In the following claims we use the term "recording support" not only to include paper or the like but also stencil sheets.

We claim:

1. A recording support for recording controlled spark discharges passing through the said support, which has a thickness smaller than about 0.1 mm. and a dielectric strength between about 300 volts per 0.05 mm. and about 40 volts per 0.05 mm.

2. A recording support for recording controlled spark discharges passing through the said support, which has a thickness smaller than about 0.1 mm. and is sized with hydrophile size and impregnated with an electrolyte, and which has a dielectric strength between about 300 volts per 0.05 mm. and about 40 volts per 0.05 mm.

3. A recording support for recording controlled spark discharges passing through the said support, which has a thickness smaller than about 0.1 mm. and is weakly sized with hydrophobe size and impregnated with an electrolyte, and which has a dielectric strength between about 300 volts per 0.05 mm. and about 40 volts per 0.05 mm.

4. A recording support for recording controlled spark discharges passing through the said support, which has a thickness smaller than about 0.1 mm. and is unsized and impregnated with an electrolyte, and which has a dielectric strength between about 300 volts per 0.05 mm. and about 40 volts per 0.05 mm.

5. A recording support for recording controlled spark discharges passing through the said support, which has a thickness smaller than about 0.1 mm. and is sized with hydrophile size and impregnated with a hygroscopic substance and an electrolyte, and which has a dielectric strength between about 300 volts per 0.05 mm. and about 40 volts per 0.05 mm.

6. A recording support for recording controlled spark discharges passing through the said support, which has a thickness smaller than about 0.1 mm. and is weakly sized with hydrophobe size and impregnated with a hygroscopic substance and an electrolyte, and which has a dielectric strength between about 300 volts per 0.05 mm. and about 40 volts per 0.05 mm.

7. A recording support for recording controlled spark discharges passing through the said support, which has a thickness smaller than about 0.1 mm. and is unsized and impregnated with a hygroscopic substance and an electrolyte, and which has a dielectric strength between about 300 volts per 0.05 mm. and about 40 volts per 0.05 mm.

8. A recording support for recording controlled spark discharges passing through the said support, which has a thickness smaller than about 0.1 mm. and has embedded good conductors of electricity in a state of fine division in its body, and which has a dielectric strength between about 300 volts per 0.05 mm. and about 40 volts per 0.05 mm.

9. A stencil sheet adapted to be punctured by electric sparks, which has a thickness smaller than about 0.1 mm. and a support consisting of paper, and which has a dielectric strength between about 300 volts per 0.05 mm. and about 70 volts per 0.05 mm.

10. A stencil sheet adapted to be punctured by electric sparks, comprising a coated paper having a thickness smaller than about 0.1 mm. and a dielectric strength between about 300 volts per 0.05 mm. and about 70 volts per 0.05 mm.

WILHELM KORESKA.
RICHARD LANT.